May 1, 1956
H. W. CHRISTENSON
SUMPS FOR TANK AND OTHER SIMILAR
TYPES OF VEHICLE TRANSMISSIONS
Filed Oct. 14, 1952
2,743,627
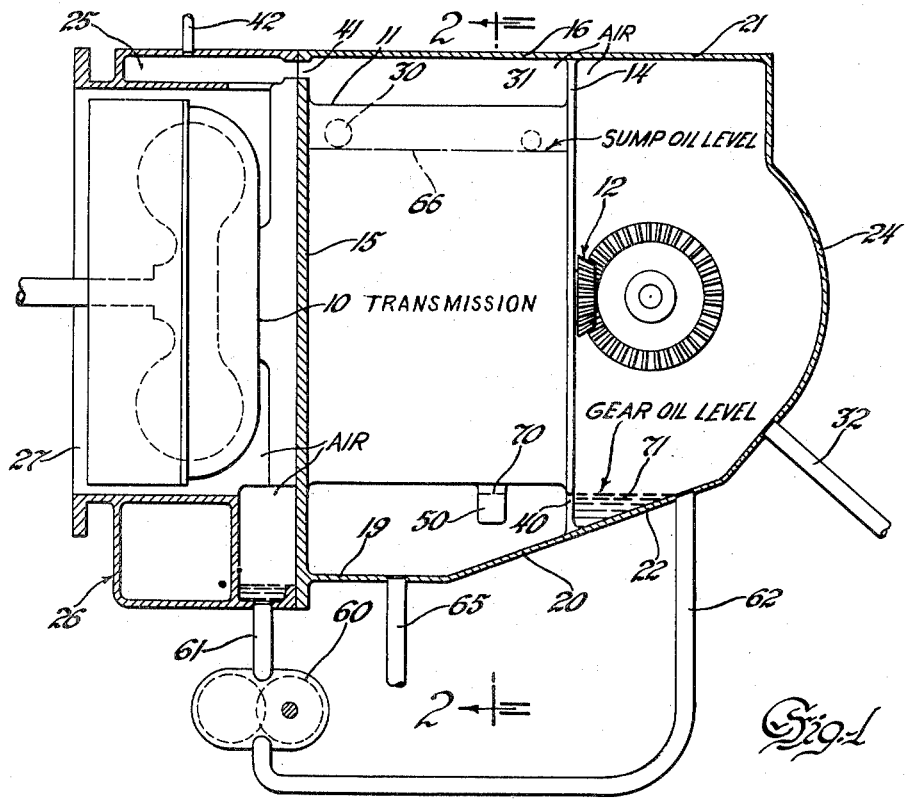
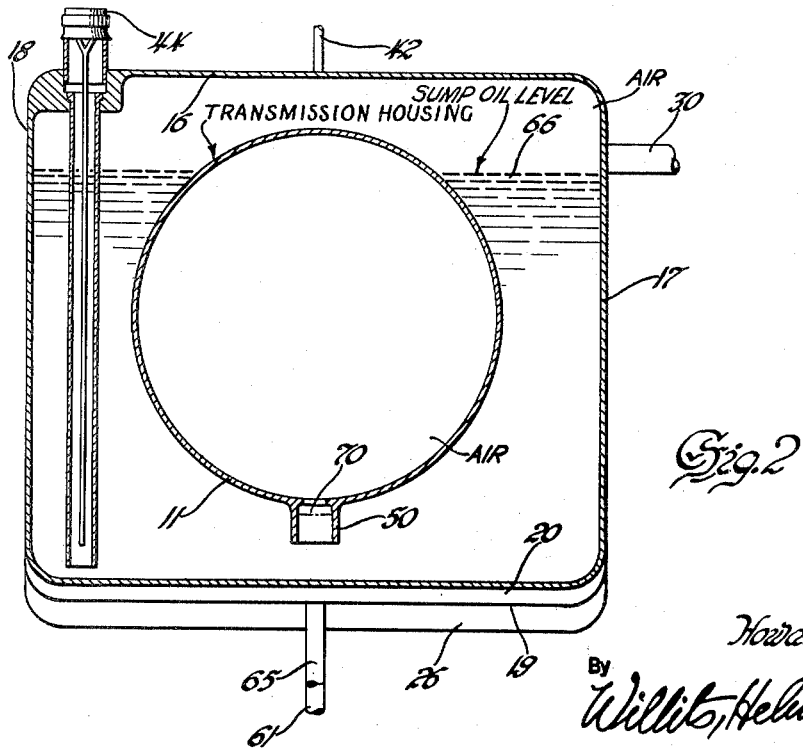
Inventor
Howard W. Christenson
By Willits, Helwig & Baillio
Attorneys United States Patent Office 2,743,627
Patented May 1, 1956

2,743,627

SUMPS FOR TANK AND OTHER SIMILAR TYPES OF VEHICLE TRANSMISSIONS

Howard W. Christenson, Indianapolis, Ind., assignor to General Motors Corporation, Detroit, Mich., a corporation of Delaware Application October 14, 1952, Serial No. 314,630

8 Claims. (Cl. 74—606)

This invention relates to improvements in sumps for automotive transmissions and more particularly to improvements in sumps for tank and other similar types of vehicle transmissions.

In tanks and vehicles of somewhat similar character, it has become customary to make use of transmission components such as fluid turbo devices (torque converters, fluid couplings, etc.), gearing such as that of the planetary type, and also cooled brakes, all of which necessitates the provision of a relatively large quantity of fluid, such as oil, for both lubricating and cooling functions. Since a relatively large quantity of fluid is required for the satisfactory operation of such a vehicle, it becomes necessary to provide a relatively large sump, particularly in connection with the transmission components, and since the ground clearance of tanks, tractors, and the like is such that there is insufficient space to extend the transmission housing below the gearing far enough to serve as a reservoir or sump for an adequate supply of oil, a sump otherwise disposed becomes necessary. In transmissions of this type, it is not desirable to have the fluid level in the housing high enough to submerge the gearing because of power loss, friction, frothing, and heating of the fluid. Consequently, it is essential to provide a sump which, in effect, is located externally relative to the gearing, and to provide means for normally removing from the transmission housing, or enclosure, the fluid, such as oil, which is discharged from the gearing as a result of force feed lubrication, or leakage, from certain components associated with the gearing.

An object of the present invention is to provide a compartmented housing for the transmission components, which housing is divided into a plurality of compartments, each having therein certain of the components, and one compartment of which is so dimensioned as to provide a storage space or sump for the necessary supply of fluid without incuring the objectionable features above discussed.

Another object of the invention is to provide a compartment in which can be mounted an enclosure for gearing components of the transmission, which enclosure communicates with the compartment only through a drain duct, and to provide an arrangement whereby fluid in the other compartments is forced into the sump compartment to a level above that in the other compartments.

Another object of the invention is to provide a compartment which serves to retain a gearing enclosure and to serve as a reservoir or sump for a relatively large quantity of fluid, in association with another compartment under air pressure which forces fluid therefrom into the first compartment.

A further object of the invention is to provide associated compartments in which one serves as a sump, one as a container for transmission elements from which fluid may be discharged, and another as a container for other transmission elements from which fluid may be scavenged, together with a pump for withdrawing air and escaped fluid from the third compartment to be introduced into the second compartment where the fluid settles to the bottom and is thence forced, under air pressure through a connecting port into the sump compartment.

A still further object of the invention is to provide a housing as above described in which the gearing enclosure communicates with the compartment under air pressure and also with the sump compartment whereby the air pressure serves to force fluid both from the compartment under pressure and from the enclosure to depress the level of fluid in this particular compartment and in the enclosure to a point at which it will not interfere with the proper operation of the transmission components.

In carrying out the foregoing and other objects of the invention, a transmission housing is so constructed as to provide three compartments. The central compartment has substantially parallel walls formed as extensions of the end walls of a gearing enclosure. Bottom, top, and side walls complete this compartment. The enclosure has a drain duct in the bottom thereof emptying into the space in the compartment below the enclosure at a short distance above the bottom of the compartment. A second compartment serves to contain output gearing and is provided with walls partially formed as continuations of the walls of the first compartment. The partition between these two compartments is provided with an opening spaced a predetermined distance above the bottoms of the two compartments, with the top of the opening located at a higher elevation than the open end of the drain duct before mentioned. A third compartment is adjacent an end wall of the first compartment opposite the second compartment and serves to retain a fluid turbo device such as a torque converter. A pump is provided for withdrawing air from the third compartment and forcing it into the second compartment and also for acting in a similar manner on any fluid which may escape from the fluid turbo device.

Due to the fact that the second compartment is substantially closed to atmosphere, it follows that air introduced thereinto will build up a pressure sufficient to force fluid in this compartment into the first compartment to a static level depending on the air pressure. This pressure can be of such magnitude as to force all fluid from the second compartment to a level determined by the top of the opening between the first and second compartments. Furthermore, since output gearing extends from the enclosure in the first compartment into the second compartment, it follows that air can pass from the second compartment into this enclosure and, as the pressure increases, such pressure will force fluid from the enclosure into the compartment surrounding the enclosure, with the fluid retained in the enclosure or its drain duct being maintained in the same level as the fluid in the second compartment. Fluid can be introduced into any or all of the compartments following the use thereof in various parts of the transmission, as will be obvious to those skilled in the art.

Other features, objects, and advantages of the invention will become evident by reference to the following detailed description of the accompanying drawings:

Fig. 1 is a vertical section of an embodiment of this invention and

Fig. 2 is a section taken substantially on the line 2—2 of Fig. 1.

Referring to the drawings, various components embodied in a type transmission for use in tanks and similar vehicles have been illustrated. For example, 10 indicates diagrammatically a fluid turbo device such as a torque converter, a fluid coupling, or the like. An enclosure 11 has been shown with the understanding that gearing of any desired nature can be contained therewithin. If desired, this gearing can be of the planetary type and can be so constructed as to constitute either a manually operated or an automatic plural step-ratio change mechanism. Output gearing shown at 12 may be of the cross drive type or may be of any other suitable type. In order that these components may be housed, the present invention contemplates that compartments be provided for certain segregated parts of the transmission. For example, the end walls 14 and 15 of the enclosure 11 have been extended in all directions to provide a pair of substantially parallel partitions for a first compartment. This compartment is completed by a top wall 16, side walls 17 and 18 and a bottom made up of a horizontal wall 19 extending into an inclined portion 20 shown clearly in Fig. 1.

A second compartment is formed by continuing the top wall 16 as indicated at 21 and by continuing the bottom wall 20 as indicated at 22. These top and bottom walls can be connected by an end wall 24 of suitable shape to accommodate transmission components. Parallel side walls (not shown) complete the compartment.

The third compartment is formed by a continuation 25 of top wall 16, a bottom 26 which may have cells therein, an end wall 27, and parallel side walls, not shown.

Since a sump or reservoir for a considerable quantity of fluid such as oil is necessary for the efficient operation of this transmission and also for other purposes, it will be noted by referring to Fig. 2 that the side, top, and bottom walls of the first compartment are so spaced from the circular wall of enclosure 11 as to provide, in effect, a tank of suitable capacity for the retention of fluid. While the enclosure 11 has been shown as being of substantially circular shape in cross-section, it will be understood that other configurations, depending upon the gearing arrangements, can be used. Inasmuch as this first compartment serves as a sump or reservoir, fluid entry lines 30 and 31 have been illustrated. An additional fluid entry or return line 32 has been shown connected to the second compartment above the bottom thereof. The various entry lines can be connected to different parts of the mechanism such as oil coolers, oil cooled brakes, and the like.

A passageway 40 is shown in the lower part of wall 14, with the top thereof spaced a predetermined distance above the bottoms of the first and second compartments. An opening 41 is provided in the wall 15 near the top thereof to provide communication between the first and third compartments. A vent pipe 42 in top wall 20 serves to vent the first and third compartments to atmosphere. If desired, an oil level indicator 44 may be provided in the first compartment for its usual function.

It will be noted that the second compartment containing the output gearing 12 is substantially closed to atmosphere, but that this compartment is in communication with the enclosure 11 for the passage of air due to the fact that parts of the gearing 12 extend through the wall 14 with such a fit as to permit lubrication of these parts and hence, air may readily pass from one of these spaces into the other. Any connection between the gearing in the enclosure and the fluid turbo device will, in most instances, be a fluid-tight connection. Due to this arrangement, air in either the enclosure 11 or the second compartment can escape only through the passageway 40 in wall 14 or through a drain duct 50 in the bottom of the enclosure, which duct terminates at a point lower than the upper edge of the passageway 40.

In order that air under pressure may be supplied to the second compartment and thence into the enclosure, a pump 60 has its intake connected through pipe 61 to the bottom of the third compartment, and has its outlet connected through pipe 62 to the bottom of the second compartment.

The operation of this arrangement for the intended purpose is substantially as follows. Liquid withdrawn from the first compartment through outlet pipe 65 for use in various parts of the mechanism can be returned to the housing through the various entry pipes 30, 31, or 32. However, as before mentioned, it is desired that the gearing within the enclosure 11 and within the second compartment be free from operation in an oil bath due to resultant friction losses, frothing, and heating of the oil. Consequently, the pump 60 which is driven constantly withdraws air from the third compartment and introduces it into the second compartment. As pressure is built up in the second compartment, any oil introduced thereinto, either through the pipe 32 or by dripping from the gearing 12, will be forced from the second compartment into the first compartment through the passageway 40. This same air pressure will be developed in the enclosure 11 so that oil dripping from the gearing therein will not accumulate in the enclosure but will be forced therefrom through the drain duct 50 into the sump space in the first compartment. All fluid or oil, however, will not be evacuated from the second compartment since as soon as air begins to escape at the top of the passage 40 the static head of oil in the sump will act to return oil to the second compartment, with the result that the level of oil in this second compartment will be maintained approximately at the top edge of the passageway 40. The end result of this arrangement is that oil can be retained in the sump at a level 66 shown in Fig. 2, or at such other level as will be determined by the quantity of oil used in the mechanism. Furthermore, since the enclosure 11 has air under pressure therein to the same degree as the second compartment, it follows that oil will be retained in the drain duct 50 at the same level as the oil in the second compartment; these respective levels being indicated by the lines 70 and 71.

The pump 60 is of a type which will act upon either air or liquid so that any liquid escaping from the fluid turbo device 10 will be withdrawn from the third compartment and introduced into the second compartment for reuse.

It will be apparent that the apparatus just described provides a sump arrangement in which oil can be stored at a higher level than could normally be expected, since the oil is, in effect, in position surrounding certain parts of the gearing without actually being in contact therewith. In this manner the necessity for extending the sump to a considerable distance below the gearing is obviated, and hence ground clearance is protected.

It will be understood that departures from the illustrated embodiment may be made within the scope of the invention as defined in the following claims.

What is claimed is:

1. In a vehicle having transmission components, a plurality of compartments housing said components, a first of said compartments containing fluid in addition to transmission components, a second of said compartments being substantially closed to atmosphere and having a passage communicating with said first compartment near the bottoms thereof, and means for developing air pressure in said second compartment to force liquid therefrom into said first compartment, the level of liquid in the second compartment being determined by the height of said passage above the bottom thereof.

2. In a vehicle having transmission components, a plurality of compartments housing said components, a first of said compartments containing fluid, an enclosure for components in said first compartment, said enclosure having an opening at the bottom thereof into said compartment, a second of said compartments being substantially closed to atmosphere and having a passage communicating with said first compartment near the bottoms thereof, and means for developing air pressure in said second compartment and in said enclosure to force liquid therefrom into said first compartment, the level of liquid in the second compartment being determined by the height of said passage above the bottom thereof.

3. In a vehicle having transmission components, a plurality of compartments housing said components, a first of said compartments containing fluids, an enclosure for components in said first compartment, said enclosure having a drain duct extending from the bottom thereof into said compartment, a second of said compartments being substantially closed to atmosphere and having a passage communicating with said first compartment near the bottoms thereof, and means for developing air pressure in said second compartment and in said enclosure to force liquid therefrom into said first compartment, the level of liquid in the second compartment and in said duct being determined by the height of said passage above the bottom thereof.

4. In a vehicle having transmission components, a plurality of compartments housing said components, a first of said compartments containing fluid, an enclosure for components in said first compartment, said enclosure having a drain duct extending from the bottom thereof into said compartment, a second of said compartments being substantially closed to atmosphere and having a passage communicating with said first compartment near the bottoms thereof, said second compartment and said enclosure being in communication for the passage of air, said duct extending below the top of said passage, and means for developing air pressure in said second compartment and in said enclosure to force liquid therefrom into said first compartment, the level of liquid in the second compartment and in said duct being determined by the height of said passage above the bottom thereof.

5. In a vehicle having transmission components, a plurality of compartments housing said components, a first of said compartments containing liquid and being open to atmosphere, a second of said compartments being substantially closed to atmosphere and having a passage communicating with the first compartment near the bottoms thereof, a pump for pumping air from a third of said compartments into said second compartment, the level of liquid in the second compartment being determined by the height of said passage above the bottom thereof.

6. In a vehicle having transmission components, a plurality of compartments housing said components, a first of said compartments containing liquid and being open to atmosphere, a transmission component enclosure in said first compartment, a drain duct extending from the bottom of said enclosure into said compartment, a second of said compartments being substantially closed to atmosphere and communicating with said enclosure for the passage of air and having a passage communicating with the first compartment near the bottoms thereof, a pump for pumping air and casual liquid from a third of said compartments into said second compartment to force liquid from said second compartment and said enclosure into said first compartment, the level of liquid in the second compartment and in said duct being determined by the height of said passage above the bottom thereof.

7. In a vehicle having transmission components, a plurality of compartments housing said components, a first of said compartments containing liquid and being open to atmosphere, a second of said compartments being substantially closed to atmosphere and having a passage communicating with the first compartment near the bottoms thereof, a third compartment having a fluid turbo device therein, a pump for pumping air from said third compartment into said second compartment and for pumping liquid escaping from said device into said second compartment, the level of liquid in the second compartment being determined by the height of said passage above the bottom thereof.

8. In a vehicle having transmission components, a plurality of compartments housing said components, a first of said compartments containing liquid and being open to atmosphere, a transmission component enclosure in said first compartment, a drain duct extending from the bottom of said enclosure into said compartment, a second of said compartments being substantially closed to atmosphere and communicating with said enclosure for the passage of air and having a passage communicating with the first compartment near the bottoms thereof, a third compartment having a fluid turbo drive device therein, a pump for pumping air from said third compartment into said second compartment to force liquid from said second compartment and said enclosure into said first compartment and also for pumping liquid escaping from said device into said second compartment, the level of liquid in the second compartment being determined by the height of said passage above the bottom thereof.

References Cited in the file of this patent

UNITED STATES PATENTS 1,645,371    Carey  ---------------- Oct. 11, 1927